US007469291B2

(12) United States Patent
Hammell et al.

(10) Patent No.: US 7,469,291 B2
(45) Date of Patent: Dec. 23, 2008

(54) APPARATUS AND METHOD FOR INTEGRATING AUTHENTICATION PROTOCOLS IN THE ESTABLISHMENT OF CONNECTIONS BETWEEN COMPUTING DEVICES

(75) Inventors: Jonathan F. Hammell, Dobbinton (CA); Ian M. Robertson, Waterloo (CA); Michael K. Brown, Kitchener (CA); Michael G. Kirkup, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 773 days.

(21) Appl. No.: 10/945,950

(22) Filed: Sep. 22, 2004

(65) Prior Publication Data

US 2006/0064493 A1 Mar. 23, 2006

(51) Int. Cl.
*G06F 15/173* (2006.01)
(52) U.S. Cl. .................................. 709/225
(58) Field of Classification Search ............ 709/225, 709/217, 201, 230
See application file for complete search history.

(56) References Cited

U.S. PATENT DOCUMENTS

| 5,241,594 | A | * | 8/1993 | Kung | ................. 713/151 |
| 5,546,463 | A | | 8/1996 | Caputo et al. | |
| 6,697,864 | B1 | * | 2/2004 | Demirtjis et al. | ............ 709/229 |
| 6,718,328 | B1 | * | 4/2004 | Norris | ................. 707/9 |
| 6,817,521 | B1 | * | 11/2004 | Matada | .............. 235/380 |
| 2003/0135734 | A1 | | 7/2003 | Fagan et al. | |

* cited by examiner

Primary Examiner—David Y Eng
(74) Attorney, Agent, or Firm—Bereskin & Parr (57) ABSTRACT

An apparatus and method for integrating authentication protocols in the establishment of connections between a controlled-access first computing device and at least one second computing device. In one embodiment of the invention, network access user authentication data needed to access the at least one second computing device is transmitted to an authentication server automatically if the user has access to use the first computing device, thereby not requiring the user to manually enter the authentication data needed for such access at the first computing device. The network access user authentication data may be, for example, retrieved from a memory store of the first computing device and/or generated in accordance with an authentication data generating algorithm.

19 Claims, 6 Drawing Sheets

APPARATUS AND METHOD FOR INTEGRATING AUTHENTICATION PROTOCOLS IN THE ESTABLISHMENT OF CONNECTIONS BETWEEN COMPUTING DEVICES

FIELD OF THE INVENTION

The present invention relates generally to controlled-access computing devices, and more specifically to user authentication protocols employed in the establishment of connections between controlled-access computing devices and other computing devices.

BACKGROUND OF THE INVENTION

Internet protocols exist that govern communications between a host computing device and a client computing device. For example, in an Internet Protocol Security (Ipsec) based virtual private network (VPN), packets relating to the exchange of keys used for encrypting and authenticating data, and packets relating to the exchange of the data itself are typically communicated between the host and client computing devices.

There exist implementations of IPsec based VPNs which rely on Extended Authentication (XAUTH), a feature of the Internet Key Exchange (IKE) protocol, to negotiate authentication of a user of the client computing device requesting access to the host computing device, or more generally to a host network. XAUTH provides a mechanism for transporting challenges and responses, typically on behalf of an authentication server coupled to the host computing device or network. There exist different types of authentication servers, many of which require the user requesting access to supply some amount of information in order to verify his identity.

For example, SecurID® is a mechanism developed by RSA Security Inc. for authenticating a user to a network resource. The SecurID authentication mechanism consists of a token, which in one known implementation is a piece of portable hardware assigned to a user that generates an authentication code every sixty seconds using a built-in clock and a serial number encoded in a read-only memory. In order to authenticate the user, the user enters the generated authentication code, typically along with some other authentication data supposedly known only to the user. For example, the user will typically need the generated authentication code, the user's password for VPN access, and knowledge of how to combine these two pieces of information in order to gain VPN access.

Negotiating user authentication can be particularly inconvenient and cumbersome to mobile device users, especially where a user is required to carry around both his mobile device and the token, and to manually enter the authentication code and/or other authentication data for every negotiation. Furthermore, the smaller the mobile device, the more difficult it typically is to enter such information into the mobile device when prompted.

SUMMARY OF THE INVENTION

Embodiments of the invention are generally directed to an apparatus and method for integrating authentication protocols in the establishment of connections between a first computing device and at least one second computing device, in which one or more authentication codes and/or other authentication data needed to access the at least one second computing device is transmitted to an authentication server automatically, thereby not requiring the user to manually enter the authentication code(s) or other authentication data needed for such access.

In accordance with one broad aspect of the invention, there is provided a method of integrating authentication protocols in establishing a connection between a first computing device and at least one second computing device, the method comprising the steps of: receiving a request from a user of the first computing device to access the at least one second computing device, wherein the first computing device is a controlled-access device; and establishing a connection between the first computing device and the at least one second computing device; the establishing step comprising negotiating user authentication for the at least one second computing device, wherein if the user has access to use the first computing device, network access user authentication data stored on the first computing device is transmitted to an authentication server for authentication of the user.

In accordance with another broad aspect of the invention, the method also comprises the additional steps of: receiving device access user authentication data from a user requesting access to use the first computing device; authenticating the user at the first computing device using the device access user authentication data; and granting access to use the first computing device to the user if the user is successfully authenticated at the first computing device; wherein the connection between the first computing device and the at least one second device is established only if the user is successfully authenticated at the first computing device.

BRIEF DESCRIPTION OF THE DRAWINGS

For a better understanding of various embodiments described herein by way of example, reference will be made to the accompanying drawings in which.

DETAILED DESCRIPTION OF THE INVENTION

Embodiments of the invention are generally directed to an apparatus and method for integrating authentication protocols in the establishment of connections between a first computing device and at least one second computing device. In some embodiments, the first computing device is a mobile station.

A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
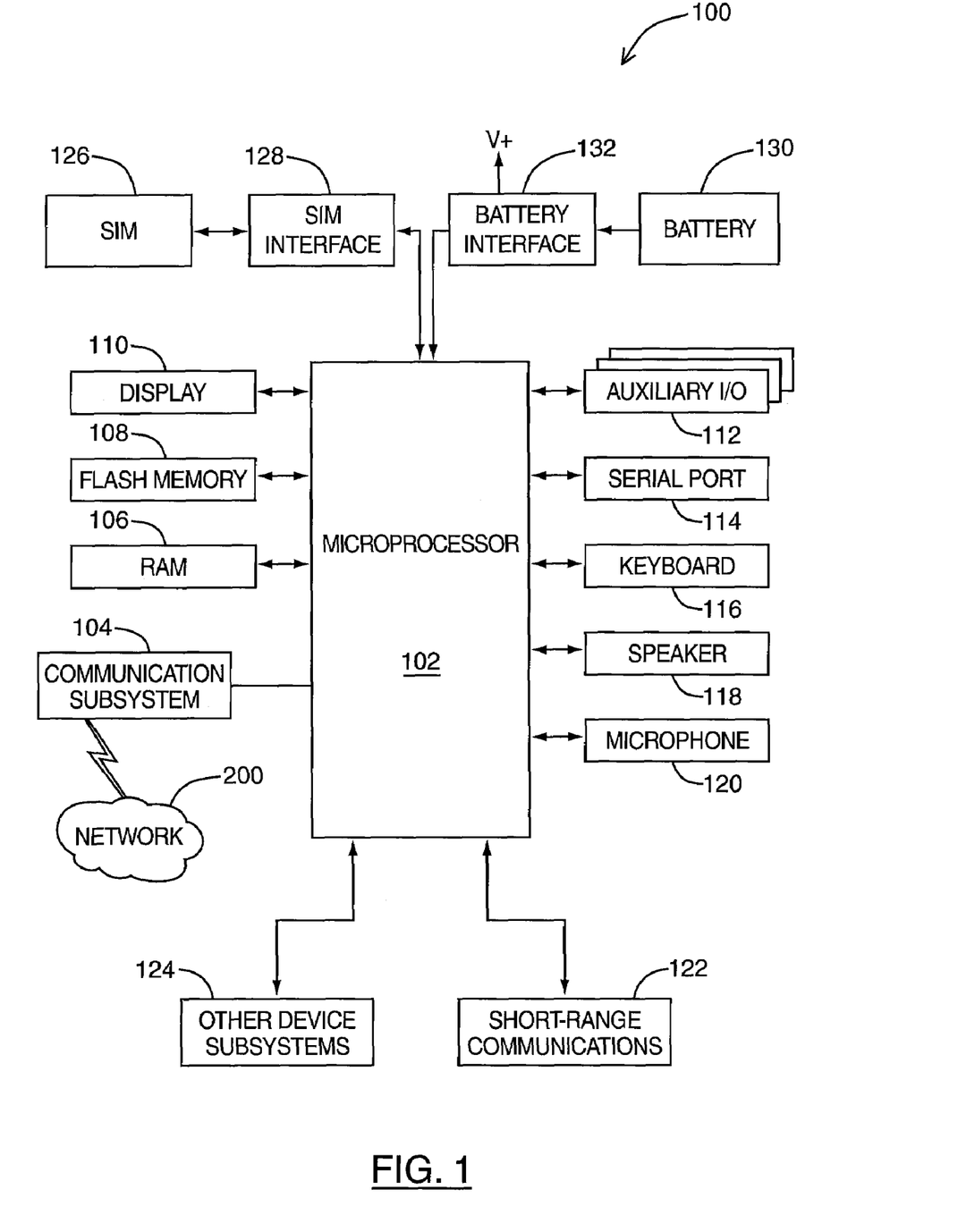
FIG. 1 is a block diagram of a mobile device in one example implementation.
Figure 2:
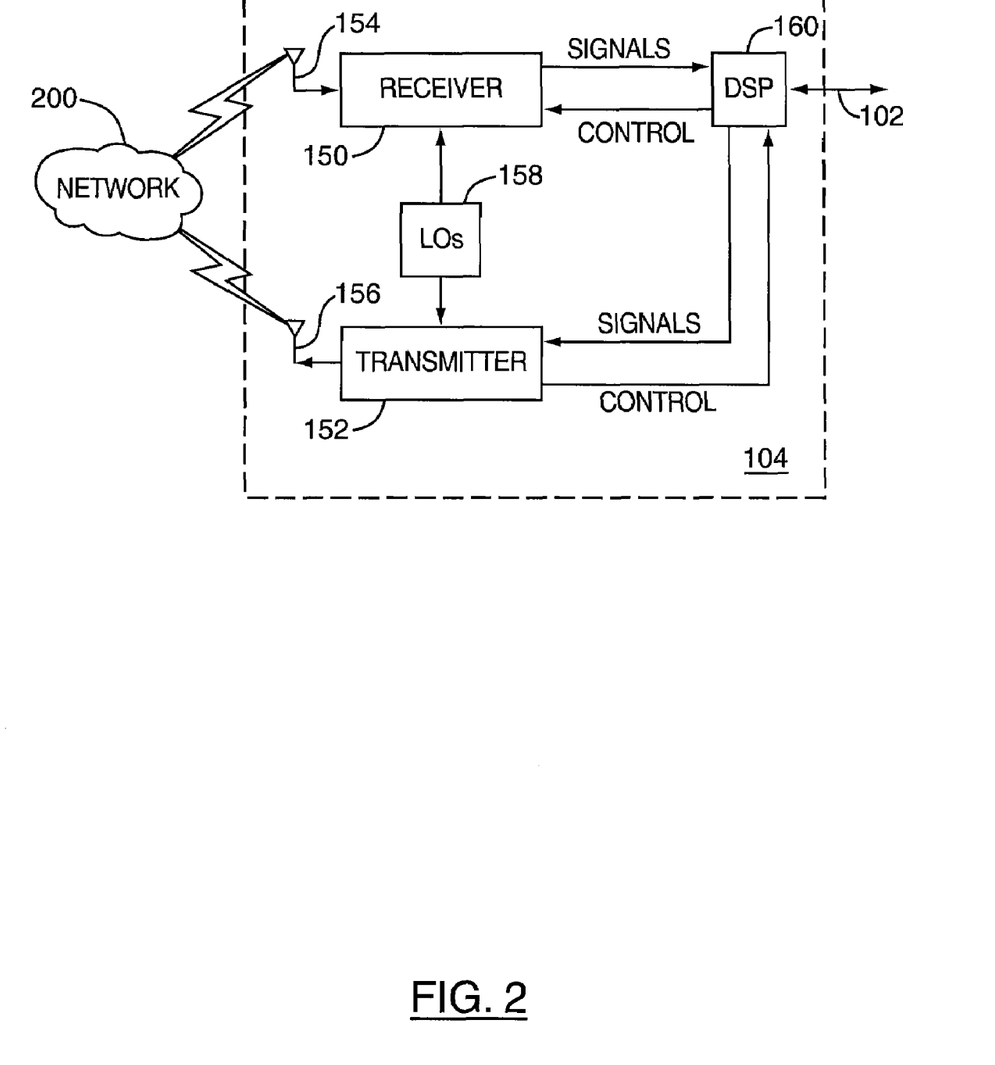
FIG. 2 is a block diagram of a communication subsystem component of the mobile device of FIG. 1.
Figure 3:
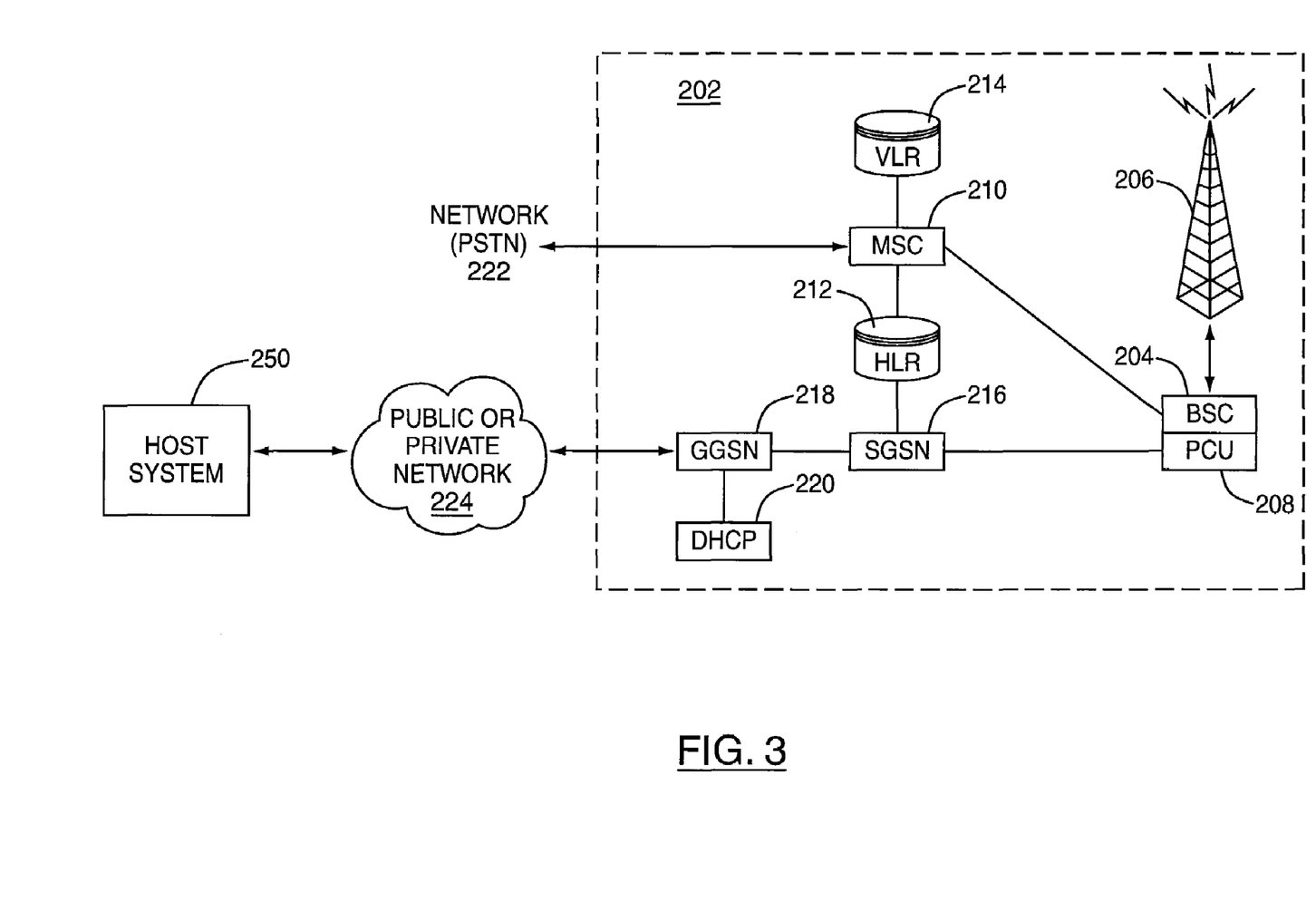
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as email, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

In one embodiment of the invention, a user of mobile device 100 requests access to a host system 250. Host system 250 may be an office network for example, which the user wishes to access through his mobile device 100. A connection may be established to connect mobile device 100 and host system 250 in a VPN as shown in FIG. 4, for example, in which IP packets are exchanged between mobile device 100 and host system 250 over the public or private network (e.g. Internet) 224 (also referred to herein as a "shared network" or "shared network infrastructure").

Figure 4:
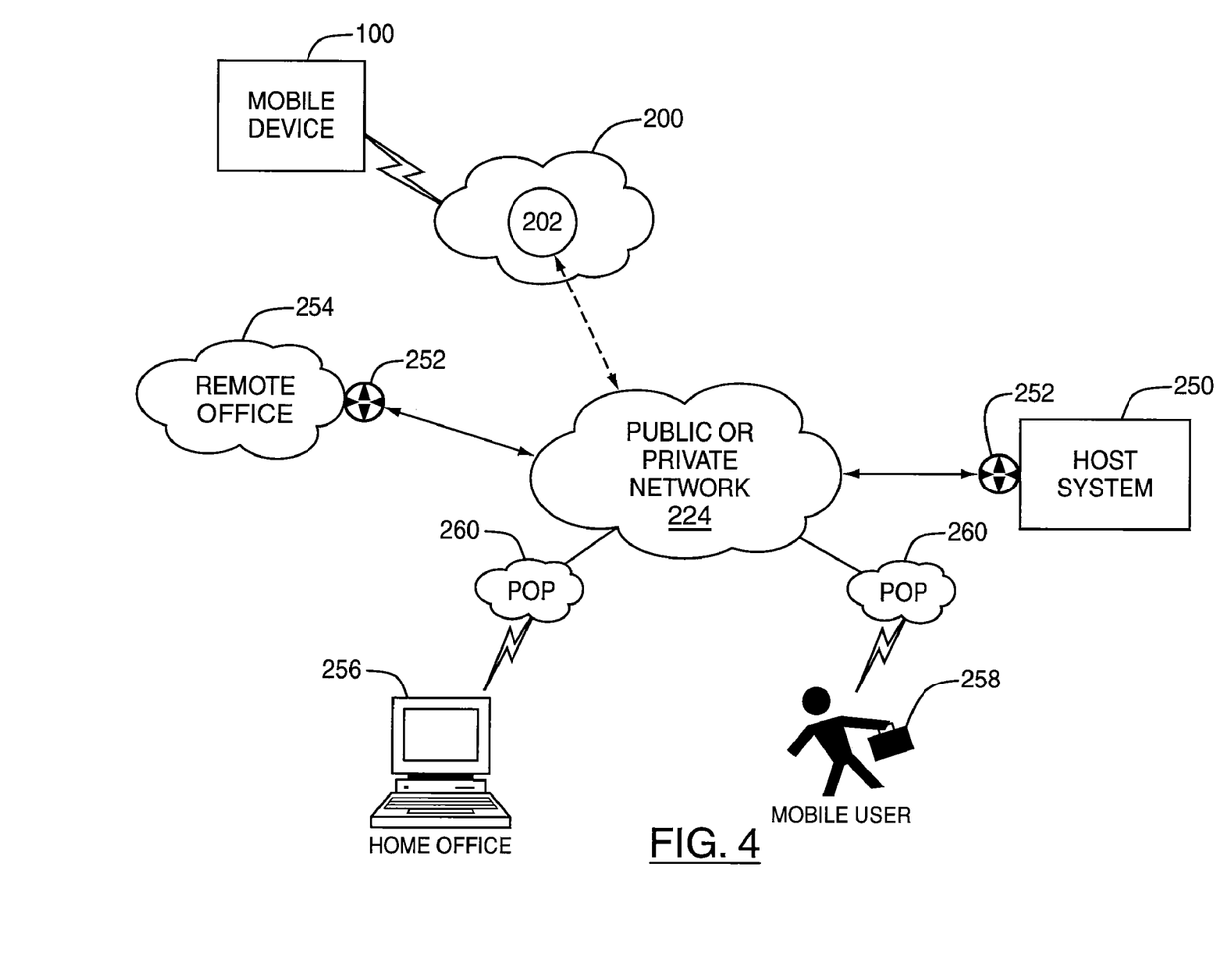
FIG. 4 is a block diagram of an example topology of a virtual private network.

Referring now to FIG. 4, a block diagram of an example topology of a virtual private network is shown. It will be understood by persons skilled in the art that the following discussion is not intended to be a complete description of IPsec and VPNs. It will also be understood by persons skilled in the art that certain embodiments of the invention may be directed to implementations governed by different protocols and/or in which a VPN is not established between computing devices. For example, certain embodiments of the invention may be applied to 802.11 authentication.

In the example topology shown, mobile device 100 communicates with host system 250 through a node 202 of wireless network 200 and a shared network infrastructure 224 such as a service provider network or the public Internet. Host system 250 may consist of a single computing device (e.g. a server or a desktop computer), or it may consist of a network of computing devices. Access to host system 250 may be provided through a router 252, and computing devices of host system 250 may operate from within a firewall [not shown].

In a variant implementation, host system 250 may comprise a wireless VPN router to facilitate data exchange between the host system 250 and mobile device 100. The concept of a wireless VPN router is new in the wireless industry and implies that a VPN connection can be established directly through a specific wireless network to a mobile device 100. The possibility of using a wireless VPN router has only recently been available and could be used when the new Internet Protocol Version 6 (IPV6) arrives into IP-based wireless networks. This new protocol will provide enough IP addresses to dedicate an IP address to every mobile device 100, making it possible to push information to a mobile device 100 at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to the mobile device 100 in this variant implementation.

While embodiments of the invention in which a connection is established between mobile device 100 and host system 250 are described herein, it will be understood by persons skilled in the art that certain embodiments of the invention may be employed in implementations where computing devices or systems other than mobile device 100 are to communicate with host system 250 within a VPN.

For example, as illustrated in FIG. 4, an intranet site-to-site VPN may connect a local area network at a remote office 254 or other remote location (through which access may be provided through a router 252) to host system 250 over the shared network 224. By way of further example, a remote-access VPN may connect remote users at a home office 256 or other mobile user 258 to host system 250, via a point-of-presence (POP) connection 260 through which the shared network 224 is accessed (e.g. by dial-up access). Other sites [not shown] may also communicate with host system 250 through an extranet-based VPN, as a further example.

Each of the above VPN applications is supported by secure, network-to-network, host-to-network, or host-to-host tunnels, which are virtual point-to-point connections. Tunnels may exist at several protocol layers. For example, certain tunnels provide IP-based virtual connections. In this approach, normal IP packets are routed between tunnel endpoints that are separated by some intervening network topology. Tunneled packets are wrapped inside headers that provide message integrity and confidentiality. In this regard, IPsec is a set of protocols defined by the Internet Engineering Task Force (IETF) that may be used to provide IP security at the network layer.

An IPsec-based VPN is made up of two parts: an Internet Key Exchange protocol (IKE) and IPsec protocols for data exchange. The first part, IKE, is the initial negotiation phase where devices at the two VPN endpoints agree on which methods will be used to provide security for the underlying IP traffic. Session keys for the encryption and authentication algorithms employed are distributed. IKE is also used to manage connections by defining a set of security associations for each connection. The second part, the IPsec protocols, describes how the data will be processed. These protocols include Authentication Header (AH) and Encapsulating Security Payload (ESP), for example.

Several authentication methods are supported by IKE, and are used to authenticate devices at each endpoint of an IPsec tunnel. For example, to illustrate a basic device-level authentication method used known as "pre-shared key", consider two Devices 'A' and 'B', which are configured with the same key. Device 'A' uses the key to encrypt and send a known value to Device 'B'. Device 'B' decrypts the incoming packet, using the key associated with the packet's source address. If successful, Device 'B' determines that Device 'A' is authentic. While pre-shared keys are relatively easy to deploy on a limited scale, security and efficiency issues may arise in their deployment within larger VPNs. Stronger authentication may be accomplished through public key cryptography, and in larger VPNs, a Public Key Infrastructure (PKI) can be employed to manage the enrollment, distribution, and verification of digital certificates.

To facilitate remote access by users to a host system 250 or other network resource, it is typically also necessary to provide user-level authentication. User authentication methods such as, for example, RADIUS, Terminal Access Controller Access Control System+(TACACS+), and SecurID may be employed, allowing a remote access server to communicate with an authentication server in order to determine if a particular user should be granted access. These user authentication methods, however, are not directly compatible with standard IKE, which is generally directed to device-level authentication. XAUTH is an extension of standard IKE developed to address user-level authentication.

There exist implementations of IPsec based VPNs that rely on XAUTH to negotiate authentication of users requesting access to a host system or network resource. XAUTH provides a mechanism for transporting challenges and responses, for example, typically on behalf of the authentication server. XAUTH inserts a new exchange in the middle of IKE, after device-level authentication. With XAUTH, a client computing device can be prompted for extended authentication (e.g. "send me your user's name and password"), and if a response with satisfactory user-level credentials is received, setup of the IPsec tunnel can continue. Challenge Handshake Authentication Protocol (CHAP) user authentication (e.g. RADIUS, TACACS+), two-factor token authentication (e.g. SecurID, Defender™ developed by Axent Technologies), one-time passwords (OTP) and S/Key developed by Bellcore, are examples of user authentication methods typically supported by XAUTH.

Where the client computing device is a controlled-access device, the user may therefore be required to enter user authentication data into the device to verify his identity at least twice—once to "unlock" or obtain access to use the device itself and once to authenticate himself to the authentication server. A controlled-access computing device can be defined generally as any computing device that employs some mechanism or technique to guard against unauthorized use. For example, a computing device that is password-protected, requiring a user to enter the correct password before the user is granted access to use the computing device, can be characterized as a controlled-access computing device.

For the sake of clarity in the present specification and in the claims, user authentication data used to obtain access to use a first computing device (e.g. a mobile device) is referred to generally herein as "device access user authentication data", whereas user authentication data used to obtain access to at least one second computing device (e.g. of a host system) is referred to generally herein as "network access user authentication data". As indicated earlier, requiring the user to manually enter both types of user authentication data can be cumbersome, particularly on mobile devices. Where the user is also required to carry a separate hardware device (e.g. a SecurID token) for the purposes of user authentication, the user may be further inconvenienced.

Accordingly, in certain embodiments of the invention, an authentication method used to access the at least one second computing device is integrated with extended authentication software (e.g. XAUTH) on the controlled-access device. The process of negotiating authentication when establishing a connection to the at least one second computing device is invisible to the user of the controlled-access device, in that network access user authentication data residing on the controlled-access device is transmitted automatically to an authentication server without requiring the user to manually input such data.

In one embodiment of the invention, the user is not prompted to enter network access user authentication data, such as a network login password for example. Instead, this data is retrieved from a memory store (e.g. in flash memory 108 of mobile device 100 of FIG. 1), and transmitted automatically from the controlled-access device (e.g. to an authentication server) during negotiation of user authentication.

In another embodiment of the invention where token-based authentication is employed, the user is not prompted to enter network access user authentication data in the form of a token identifier. Instead, a token generating application that resides on the first computing device and generates token identifiers in accordance with a token generating algorithm is queried. Generated token identifiers can then be transmitted automatically from the controlled-access device (e.g. to an authentication server) during negotiation of user authentication.

For example, in SecurID applications, the controlled-access device may be adapted to store the seed for a token, so that the current code or identifier that would have been displayed on a SecurID hardware device at a particular time can be automatically generated on the controlled-access device. The generated identifier need not be displayed to a user. This may eliminate the need for the user to be in possession of the hardware device.

In variant embodiments of the invention, other types of generated network access user authentication data, stored network access user authentication data, or some combination thereof, can be transmitted automatically to an authentication server during negotiation.

Therefore, in certain implementations where network access user authentication data resides on a controlled-access device (e.g. the data is either stored or generated on the device), the user's identity will only need to be verified once (i.e. when the device is "unlocked" by the user for access to use the device). This would eliminate not only the need for users to handle both the device and a token, but also the need for the user to manually enter a token identifier into the device, for example.

Other data used to facilitate user authentication may also be stored on the controlled-access device. For example, information pertaining to the format of a login string (e.g. a generated token identifier followed by a stored password, or vice-versa, or some other defined combination of network access user authentication data items) can also be stored on the controlled-access device, and used when transmitting network access user authentication data during negotiation of user authentication. Where data pertaining to a format for network access user authentication data is stored, and where network access user authentication data is transmitted for user authentication in that format, the network access user authentication data may include authentication data stored on the first computing device, or authentication data generated at the first computing device, or some combination of both stored and generated authentication data. This embodiment of the invention provides advantages over many known systems, in that it allows generated values to be combined with other data to be transmitted for user authentication, and allows a format for combined authentication data items (e.g. tokens) to be specified.

Figure 5A:
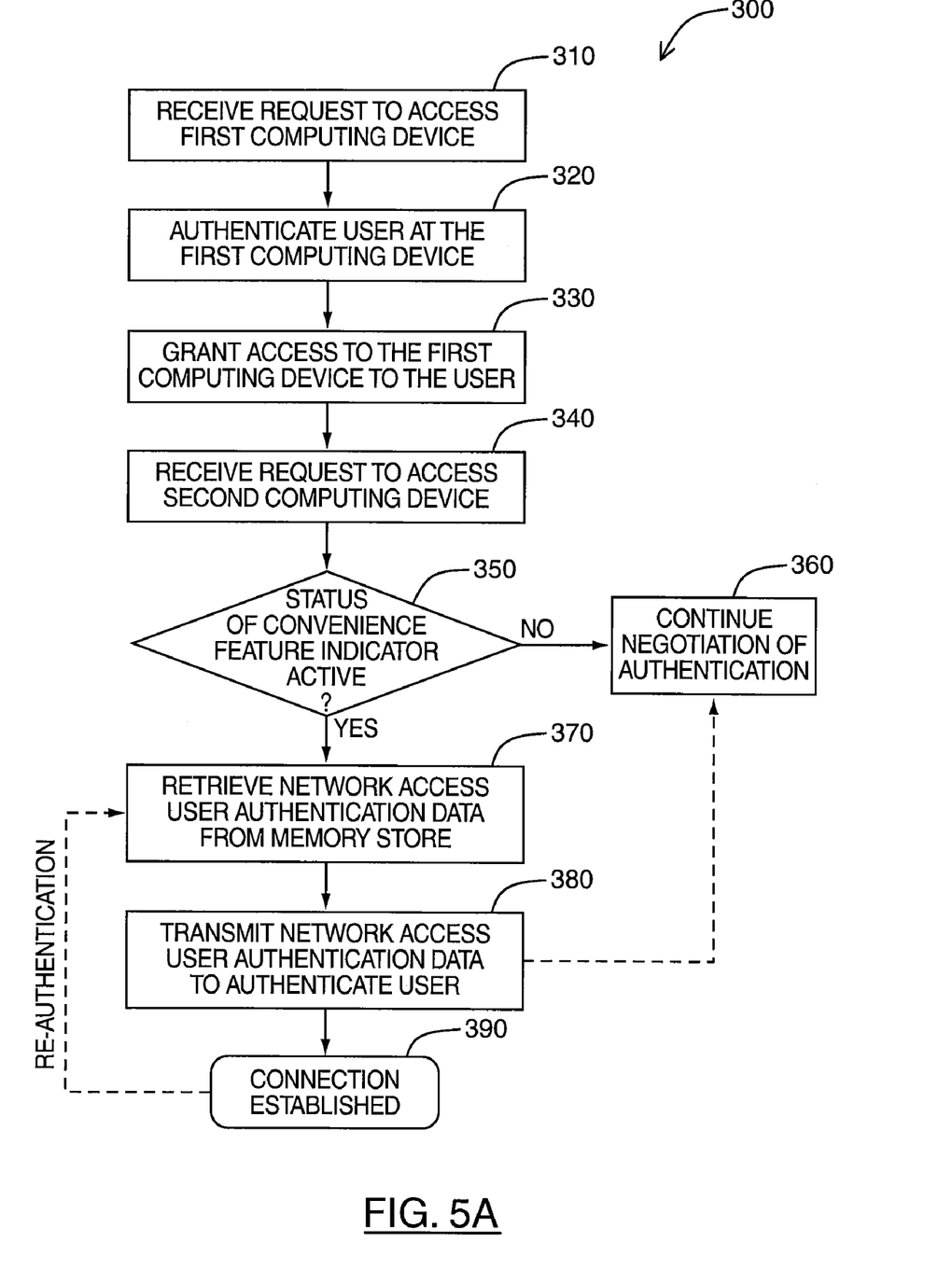
FIG. 5A is a flowchart illustrating steps in a method of integrating authentication protocols in establishing a connection between a first computing device and at least one second computing device in an embodiment of the invention.

Referring now to FIG. 5A, a flowchart illustrating steps in a method of integrating authentication protocols in establishing a connection between a first computing device and at least one second computing device in an embodiment of the invention is shown generally as 300.

At step 310, a request is received from the user to access the first computing device for use, which is a controlled-access device. The request comprises device access user authentication data input by the user. In one embodiment of the invention, the user submits a login request, which includes a user password for the device.

The device can be a mobile device (e.g. mobile device 100 of FIG. 1), for example. However, it will be understood by persons skilled in the art that applications of the invention are not limited to implementations employing mobile devices. In variant embodiments of the invention, a computing device other than a mobile device that is to communicate with the at least one second computing device can be employed.

At step 320, the user is authenticated at the first computing device. For example, the password entered by the user at step 310 is compared with a stored value for the password associated with the user, which may have been pre-defined by the user for the particular device. If the password entered is determined to be valid, the authentication succeeds. If the password entered is determined to be invalid, the authentication does not succeed, and access to the device may be refused.

In a variant embodiment of the invention, hashes of the passwords or other authentication data are stored. In that embodiment, the hashes of passwords or other authentication data entered by users would be compared to the stored hashes, as opposed to the passwords themselves.

At step 330, access to use the first computing device is granted to the user upon successful user authentication at step 320. In some embodiments of the invention, after a certain period, a user may be required to re-authenticate himself to the first computing device. For example, in one example implementation, the first computing device is a mobile device that locks itself after a certain period of inactivity. Re-authentication by the user is required to regain access to the mobile device.

At step 340, a request is received from the user of the first computing device to access at least one second computing device. Typically, a second computing device to which the user is requesting access is a remote computing device, which may be part of an office network or some other host system (e.g. host system 250 of FIGS. 3 and 4), for example. In one embodiment of the invention, the request is directed to establishing a VPN connection with the at least one second computing device.

At step 350, optionally, the state of a convenience feature indicator is confirmed. In one embodiment of the invention, the convenience feature indicator is implemented as a flag stored within the first computing device, that may be changed to control whether network access user authentication data should be automatically transmitted to an authentication server, or whether the first computing device should instead revert to requiring manual user authentication (with respect to the request for access to the at least one second computing device). The state of the convenience feature indicator is confirmed or checked before connection to the at least one second computing device is established. The convenience feature indicator will typically be stored on the first computing device, however, in a variant embodiment of the invention, the first computing device checks the state of a convenience feature indicator that is stored or maintained in a device remote from the first computing device.

The state of the convenience feature indicator may be switched between "active" and "inactive" by an application residing on a server or other computing device external to the first computing device. For example, the state of the convenience feature indicator may be switched in accordance with an organization's information technology (IT) policy ("IT Policy") governing use of the first computing device, enforced by a corporate IT administrator. Different security or access levels may be associated with a user, and changed remotely by the IT administrator. In this manner, the IT administrator can dynamically control which second computing devices the user can access (e.g. which networks the user can login to), and whether manual user authentication is required when the user attempts to access a given computing device.

The state of the convenience feature indicator may also be switched from active to inactive from time to time, requiring the user to manually verify his identity periodically for greater security.

Furthermore, if the first computing device is a mobile device, and the mobile device becomes lost, the state of the convenience feature indicator may be remotely switched to inactive, so that unauthorized users will not be granted automatic access to the second computing devices.

If the state of the convenience feature indicator is inactive, the negotiation of user authentication continues at step 360, in which a user may be required to manually verify his identity in known manner. Alternatively, the request to access the at least one second computing device can be denied [not shown]. On the other hand, if the state of the convenience feature indicator is active, the flow of method steps proceeds to step 370.

Steps 370 and 380 are performed to establish a connection between the first computing device and the at least one second computing device. In this embodiment, these steps are performed in negotiating user authentication with an authentication server, which occurs in establishing the connection. It will be understood by persons skilled in the art that other steps [not shown], depending on the specific protocol used, may be performed in establishing a connection between computing devices.

At step 370, network access user authentication data is retrieved from a memory store of the first computing device. This may comprise one or more passwords pre-defined by the user in a setup process [not shown], for example.

At step 380, the network access user authentication data retrieved at step 370 is transmitted to an authentication server (e.g. a RADIUS server). Conveniently, the user is not required to manually enter the network access user authentication data into the first computing device at this step. Security is nonetheless maintained, as the user was required to initially verify his identity before access to the first computing device itself was granted at step 330.

A connection may be established as shown at 390 if the authentication is successful. If the authentication is not successful, negotiation of user authentication may continue at step 360, in which the user may be required to manually re-submit network access user authentication data. Alternatively, the request to access the at least one second computing device can be denied [not shown].

Steps 370 and 380 may also be repeated if re-authentication is required by the authentication server. Conveniently, the user is not required to manually enter the network access user authentication data into the first computing device every time such re-authentication may be required.

In a variant embodiment of the invention, the user may be required to manually enter network access user authentication data in the initial establishment of a connection between the first computing device and the at least one second computing device, with subsequent authentications being performed automatically as required.

Figure 5B:
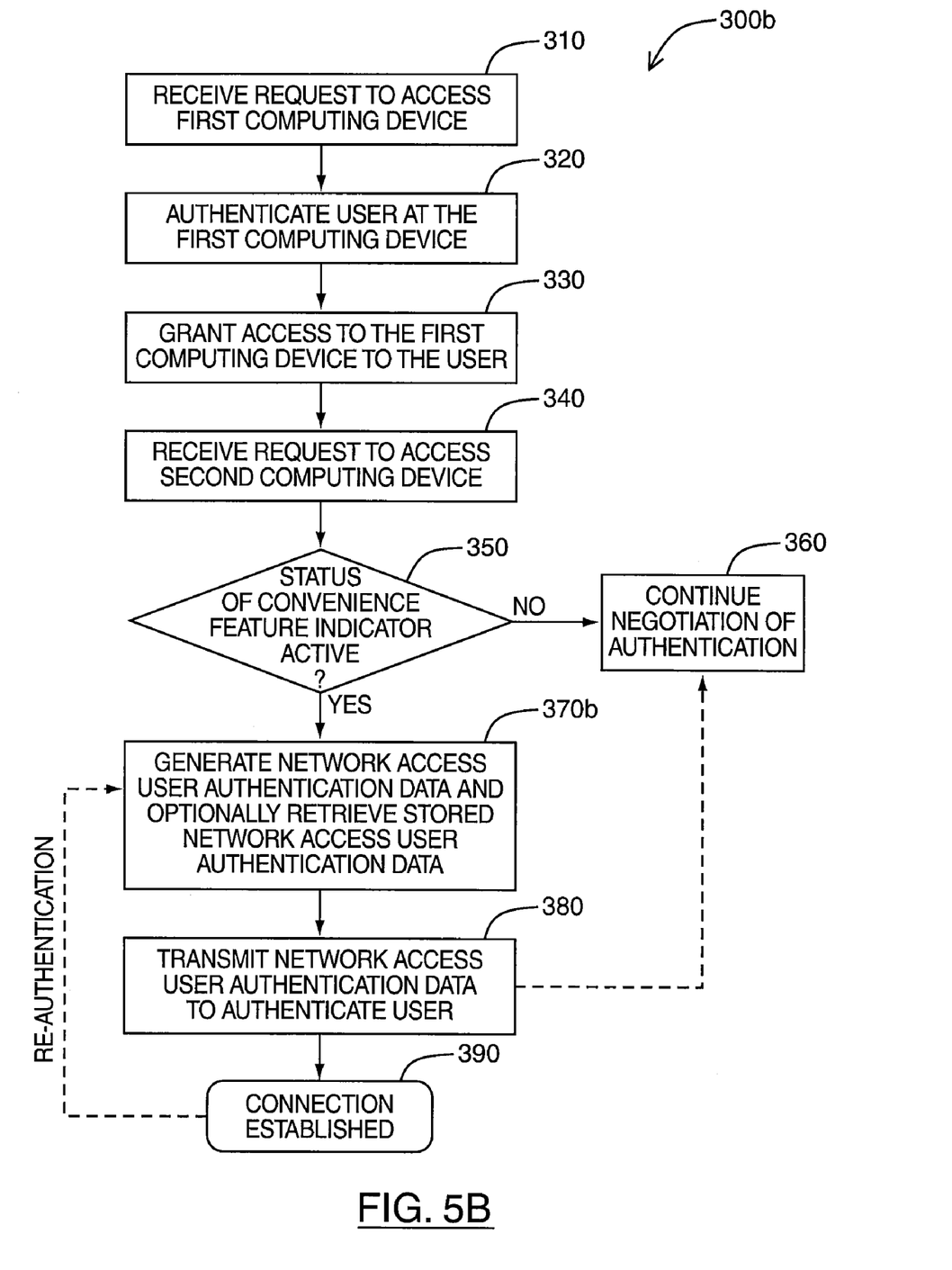
FIG. 5B is a flowchart illustrating steps in a method of integrating authentication protocols in establishing a connection between a first computing device and at least one second computing device in another embodiment of the invention.

Referring now to FIG. 5B, a flowchart illustrating steps in a method of integrating authentication protocols in establishing a connection between a first computing device and at least one second computing device in another embodiment of the invention is shown generally as 300b. The description of the steps of method 300b generally corresponds to the description of the steps of method 300 (FIG. 5A), with some modifications as described below.

In accordance with this embodiment, at step 370b, network access user authentication data is generated on the first computing device, by an authentication data generating algorithm. The algorithm may generate one or more token identifiers as network access user authentication data, for example. Optionally, additional stored network access user authentication data such as a stored network login or access password associated with the user for example, may also be retrieved in this step, to be transmitted in combination with the generated network access user authentication data at step 380. Information pertaining to the format of the string required for transmission to the authentication server can also be stored in the controlled-access device, and used to ensure that the network access user authentication data transmitted at step 380 is formatted properly.

In one variant implementation, the algorithm may implement SecurID, so that SecurID token values can be generated automatically within the first computing device for subsequent transmission to a SecurID authentication server. Conveniently, a separate device need not be carried by the user, and the user is not required to read a token value and manually input that value into the first computing device.

With respect to the authentication server employed in the negotiation of user authentication when access to the at least one second computing device is requested, the functions performed by an authentication server may be provided on a separate, physical computing device coupled to the at least one second computing device in some embodiments of the invention. In variant embodiments, the functions of the authentication server may be provided on one or more of the at least one second computing device, and need not be performed on a separate, physical computing device.

In variant embodiments of the invention, the ability of a particular user's controlled-access device to store a network login password or other network access user authentication data associated with a particular user may be restricted by an IT administrator, in accordance with an IT Policy, for example. Similarly, in variant embodiments of the invention, the ability of a particular user's controlled-access device to generate network access user authentication data, which may include the ability to generate token identifiers or to store data required to generate token identifiers, for example, may be restricted by an IT administrator, in accordance with an IT Policy, for example.

In variant embodiments of the invention, the controlled-access device may be adapted to allow users to disable device access requirements. However, for greater security, in variant embodiments of the invention, IT Policy may dictate that so long as network user authentication data is stored on the device, device access requirements must be enabled, in that a device password or other device access user authentication data must be defined and used by users to gain access to the device. IT Policy may also define criteria for the device access user authentication data (e.g. minimum password length, types of characters that may or may not be used).

In variant embodiments of the invention, IT Policy may dictate that network access user authentication data is not to be stored on a particular user's controlled-access device. In these embodiments, a user interface on the device may be adapted to receive some network access user authentication data from a user, with other network access user authentication data still being automatically generated on the device, allowing for at least partial automation of the user authentication process. Formatting information pertaining to the format of a login string may still be stored on the controlled-access device.

In variant embodiments of the invention, the controlled-access device may be adapted to obtain at least a portion of the network user authentication data required to establish a connection to the at least one-second computing device from a third computing device on which network user authentication data is generated or stored. This may enhance security in the user authentication process. Optionally, to further enhance security, the third computing device may also be adapted to inform the at least one second computing device to expect a connection request from the controlled-access device within a subsequent time interval. The at least one second computing device may be adapted to only accept connection requests received within that time interval.

The steps of a method of integrating authentication protocols in establishing a connection between a first computing device and at least one second computing device in embodiments of the invention may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of integrating authentication protocols in establishing a connection between a first computing device and at least one second computing device, the method comprising the steps of:
   a) receiving a request for user authentication at the first computing device to access the at least one second computing device, wherein the first computing device is a controlled-access device; and
   b) establishing a connection between the first computing device and the at least one second computing device;
   the establishing step comprising negotiating user authentication at the at least one second computing device by transmitting user authentication data from the first computing device to an authentication server for user authentication at the at least one second computing device, wherein the user authentication data is transmitted automatically from the first computing device to the authentication server if access to use the first computing device has been aquired;
   wherein the authentication server employs a two-factor token authentication method, such that a response that comprises an expected time-dependent token value and other authentication data is received by the authentication server for user authentication at the at least one second computing device;
   wherein the method further comprises generating the expected time-dependent token value at the first computing device, and retrieving the other authentication data from a memory store of the first computing device; and
   wherein both the expected time-dependent token value and the other authentication data are provided as the user authentication data transmitted automatically to the authentication server in the establishing step.

2. The method of claim 1, wherein the authentication server resides on a third computing device coupled to the at least one second computing device.

3. The method of claim 1, wherein the authentication server resides on one or more of the at least one second computing device.

4. The method of claim 1, further comprising the steps of:
   c) receiving device access user authentication data for requesting access to use the first computing device;
   d) performing user authentication at the first computing device using the device access user authentication data; and
   e) granting access to use the first computing device if the user authentication at the first computing device in step d) is successful;
   wherein steps a) and b) are performed if the user authentication at the first computing device is successful.

5. The method of claim 1, wherein the first computing device is a mobile device.

6. The method of claim 1, wherein the connection established at step b) connects the first computing device and the at least one second device in a virtual private network.

7. The method of claim 1, further comprising the step of storing the other authentication data in a memory store of the first computing device.

8. The method of claim 7, wherein the storing step is performed if permitted by an IT Policy governing the use of the first computing device.

9. The method of claim 7, wherein the other authentication data stored on the first computing device comprises a password.

10. The method of claim 1, wherein the generating step is performed if permitted by an IT Policy governing the use of the first computing device.

11. The method of claim 1, further comprising setting a state of an indicator to one of an active state and an inactive state to indicate whether the user authentication data should be automatically transmitted to the authentication server, wherein the user authentication data is transmitted automatically from the first computing device to the authentication server when the indicator is deteremined to be set to the active state.

12. The method of claim 11, wherein the state of the indicator is set remotely in accordance with an IT policy governing use of the first computing device.

13. The method of claim 11, wherein the establishing step further comprises confirming the state of the indicator.

14. A computer-readable medium comprising a plurality of instructions for execution on a first computing device, wherein the instructions, when executed, perform the steps of a method of integrating authentication protocols in establishing a connection between the first computing device and at least one second computing device, wherein the method comprises the steps of:
   a) receiving a request for user authentication at the first computing device to access the at least one second computing device, wherein the first computing device is a controlled-access device; and
   b) establishing a connection between the first computing device and the at least one second computing device;
   the establishing step comprising negotiating user authentication at the at least one second computing device by transmitting user authentication data from the first computing device to an authentication server for user authentication at the at least one second computing device, wherein the user authentication data is transmitted automatically from the first computing device to the authentication server if access to use the first computing device has been acquired;
   wherein the authentication server employs a two-factor token authentication method, such that a response that comprises an expected time-dependent token value and other authentication data is received by the authentication server for user authentication at the at least one second computing device:
   wherein the method further comprises generating the expected time-dependent token value at the first computing device, and retrieving the other authentication data from a memory store of the first computing device; and
   wherein both the expected time-dependent token value and the other authentication data are provided as the user authentication data transmitted automatically to the authentication server in the establishing step.

15. The medium of claim 14, wherein the method further comprises the steps of:
   c) receiving device access user authentication data for requesting access to use the first computing device;
   d) performing user authentication at the first computing device using the device access user authentication data; and
   e) granting access to use the first computing device if the user authentication at the first computing device in step d) is successful;
   wherein steps a) and b) are performed if the user authentication at the first computing device is successful.

16. The medium of claim 14, wherein the first computing device is a mobile device.

17. An apparatus for integrating authentication protocols in establishing a connection with at least one remote computing device, the apparatus comprising at least one processor, memory coupled to the at least one processor, and communication means coupled to the at least one processor to facilitate communications with the at least one remote computing device, wherein the at least one processor executes a plurality of instructions for:
  a) receiving a request for user authentication to access the at least one remote computing device, wherein the apparatus is a controlled-access device; and
  b) establishing a connection to the at least one remote computing device, wherein user authentication is negotiated at the at least one remote computing device by transmitting user authentication data to an authentication server for user authentication at the at least one remote computinci device, wherein the user authentication data is transmitted automatically to the authentication server if access to use the apparatus has been acquired;
wherein the authentication server employs a two-factor token authentication method, such that a response that comprises an expected time-dependent token value and other authentication data is received by the authentication server for user authentication at the at least one remote computing device:
wherein the at least one processor further executes instructions for generating the expected time-dependent token value, and retrieving the other authentication data from the memory: and
wherein both the expected time-dependent token value and the other authentication data are provided as the user authentication data transmitted automatically to the authentication server in establishing the connection.

18. The apparatus of claim 17, wherein the at least one processor also executes instructions for:
  c) receiving device access user authentication data for requesting access to use the apparatus;
  d) performing user authentication using the device access user authentication data; and
  e) granting access to use the apparatus if the user authentication is successful;
wherein the instructions for receiving and establishing are performed if the user authentication is successful.

19. The apparatus of claim 17, wherein the apparatus is a mobile device.

* * * * *